United States Patent Office 2,822,643
Patented Feb. 11, 1958

2,822,643

SOIL CONDITIONING AND STABILIZING WITH A COMPOSITION COMPRISING LOW MOLECULAR WEIGHT DEXTRAN

Everette E. Witt and Leo J. Novak, Dayton, Ohio, assignors to The Commonwealth Engineering Company of Ohio, Dayton, Ohio, a corporation of Ohio No Drawing. Application August 14, 1953
Serial No. 374,428

7 Claims. (Cl. 47—1)

This invention relates to soil conditioning.

Among the important characteristics of all soils are (1) the soil texture or the relative proportions of the individual grain or particle sizes; and (2) the structure or the physical form of the soil particles. The soil structure is of great importance and a granular structure in which the aggregates generally vary in size from the very small to about ½-inch in diameter is regarded as a desirable, beneficial condition. The most desirable soils of the best productivity are those having the granular structure and sufficient porosity for air, water and plant roots to penetrate through the soil as well as the capacity to retain sufficient water between rains for accomplishing plant growth. Maintenance of the soil in the desired granular, porous, moisture-retentive condition may be difficult, however, as even improper tillage will, in some cases, destroy the granular form and bring about agglomeration of the soil into very large masses which tend to pack on wetting. This massive condition of the soil can only be overcome by careful working for a period which may be years.

Considerable research has been conducted, of late, in connection with soil conditioning with the aim of providing conditioning agents or compositions which on admixture with soil will stabilize it in the form of small discrete aggregates and render it porous and capable of retaining moisture without packing or the formation of large, unworkable masses. A number of materials of different types have been proposed for use as soil conditioners. One of the difficult aspects of the problem of achieving satisfactory soil stabilization is the fact that soil varies considerably with locality with respect to its components. Usually the components are three: clay, silt and sand, but any one of these may predominate. So far, the art has not considered the specificity of soil conditioning agents depending on the type of soil to be treated, i. e., whether it is predominantly sandy or largely comprised of fine particles such as clay or silt. Adopting a new approach to the problem, we find that such specificity does exist and that agents available for conditioning and stabilizing soil tend to stabilize fine soil particles in the form of small, workable aggregates in preferance to coarse sand particles, for which the stabilizing effect is usually considerably less so that when the conditioners are applied to soil comprising clay, silt, and sand, stabilization of the soil as a whole is less than if the conditioner had a marked aggregating action for the coarse sand particles.

A primary object of this invention is to provide soil conditioning agents which when applied to soil comprising a mixture of clay, silt and sand renders the same porous and moisture-retentive and effects aggregation of the particles of the different types into small "crumbs" to condition and stabilize the soil as a whole.

Another object is to provide soil conditioning agents having a specific stabilizing action on coarse sand particles and useful in conditioning preponderantly sandy soils.

These and other objects are accomplished by the present invention based on our discovery that dextrans are not only effective soil conditioning agents but that there exists a definite relationship between the molecular weight of the dextran and its efficiency as soil stabilizer and conditioner on the one hand, and the initial size of the soil particles on the other.

The dextrans are branched polysaccharides made up of anhydroglucopyranosidic units joined by molecular structural repeating linkages some of which are alpha-1,6 linkages and others of which are non-alpha-1,6 linkages, at least 50% of the linkages being, apparently, of the alpha-1,6 type.

Dextrans of varying molecular weight and sensitivity to water are known in the art.

As mentioned above, we have now found that the efficiency of the dextrans in stabilizing soil particles in the form of discrete small aggregates is a direct function of the molecular weight of the dextran in relation to the size of the particles making up the soil. Thus, we have established that hydratable, which term includes water-soluble, dextrans having a high molecular weight equivalent to or approximating that of a "native" substantially unhydrolyzed microbiologically produced dextran are specifically and selectively effective in stabilizing, in the form of small aggregates or "crumbs," the fine particles of which clay and silt are composed, whereas lower molecular weight dextrans, i. e., those having a molecular weight or average molecular weight in the range between 5,000 and about 50,000 are specifically and selectively effective in stabilizing, in the small aggregate condition, the coarse particles or grains of which sand is composed. It is possible, therefore, to select the dextran to be used for most effectively stabilizing a given soil on the basis of the soil components and depending upon whether clay and/or silt, or sand, predominates therein.

An important advantage of this new approach to the problem of soil conditioning, and of the present invention, is that it is possible to satisfactorily stabilize as a whole, soil comprising clay, silt and sand by treating it with mixtures of the low and high molecular weight dextrans in predetermined proportions.

The water-soluble or hydratable high molecular weight dextran component of the mixture may be produced microbiologically, for example by inoculating a nutrient medium containing sucrose, particular nitrogenous compounds and certain inorganic salts with appropriate bacteria, such as those of the *Leuconostoc mesenteroides* and *L. dextranicum* types, for example, the strains which are identified (Northern Regional Research Laboratory classification) as *Leuconostoc mesenteroides* B-512, B-1190 and B-1208 and *Leuconostoc dextranicum* B-1146, and incubating the culture at the temperature most favorable to the growth of the particular microorganism.

In one method of obtaining the high molecular weight dextran there is first prepared an aqueous nutrient medium which may have the following composition:

|  | Percent by weight |
|---|---|
| Sucrose | 5–10 |
| Corn steep liquor | 2 |
| Monobasic potassium phosphate | 0.5 |
| Manganous sulfate | 0.002 |
| Sodium chloride | 0.50 |
| Water | Balance |

This medium is adjusted to a pH of between about 6.5 and 7.5, preferably 7.2, and then sterilized. The material is cooled to room temperature and inoculated with a culture of the dextran-producing bacteria, for example *Leuconostoc mesenteroides* B-512 (NRRL) and incubated at 20° to 30° C. (optimum 25° C.) until a maximum yield of dextran has been attained; usually a period of between 12 and 48 hours will be satisfactory for this procedure.

Upon completion of the fermentation, the fermentate is a thick turbid liquid containing approximately 80–85% of water and high molecular weight so-called "native" B–512 dextran, as well as bacteria, enzyme, and nitrogenous and other inorganic materials. The "native" dextran has a very high molecular weight calculated to be in the millions. The "impurities" present in the crude fermentate with the dextran have soil and plant nutrient value and the fermentate may be applied to the soil, being particularly useful when the soil requires or will be improved by the additive benefits of the nutrients present in the fermentate. The "native" dextran contained in the fermentate will exert a beneficial, stabilizing effect on fine clay or silt particles in the soil but has inferior aggregating action on sand particles therein. To adapt the fermentate to use for binding sand particles into small discrete workable aggregates, the "native" dextran contained in the fermentate is "diluted" with a predetermined amount of water-soluble or hydratable dextran having a molecular weight in the range 5,000 to about 50,000. To avoid bacterial or mold destruction of the dextran during storage prior to use of the fermentate, the latter is thoroughly sterilized when it is packaged.

Instead of using the crude fermentate, the "native" dextran may be precipitated from it by adjusting the pH to 7.0–8.0, which aids in the precipitation of phosphates, and adding a sufficient quantity of acetone or a water-miscible lower aliphatic alcohol such as methanol, ethanol or isopropanol, to precipitate the dextran. The alcohol brings down, with the dextran, occluded and adsorbed bacteria, and nitrogenous and inorganic elements. To occasion complete precipitation of the dextran, it may be desirable to allow the mix to stand for a relatively long period, such as about 6 hours. The precipitate may be dried, and reduced to particulate condition, the resulting product being a mixture of the dextran and bacteria, etc. precipitated with it, which may be sterilized and stored for later use.

The supernatant siphoned off the precipitate contains a quantity of material rich in plant nutrient value and, if desired, may be evaporated to obtain a dry product comprising the nutrients and which may be added to the dried precipitate comprising the dextran, before the precipitate is sterilized.

Before the sterilization, or before the sterile precipitate is applied to the soil, it is admixed or "diluted" with a predetermined amount of the low molecular weight dextran to obtain a composition of more general usefulness in conditioning soils of varying composition and initial particles size.

Alternatively, the "native" dextran precipitated from the fermentate may be freed or substantially freed from the contaminants precipitated with it, in any suitable way, and dried as by drum drying to obtain a fluffy material which may be reduced to a powder, or the powder may be obtained directly by spray-drying or lyophilization. The dry, substantially pure dextran is stable. It is mixed with an appropriate proportion of the dry, powdered low molecular weight dextran, and the mixture is applied to soil composed of clay, silt and sand, for stabilization of the soil as a whole in the form of small discrete aggregates.

Separation of the dextran from contaminants in the fermentate may be facilitated by adding the acetone or alcohol precipitant to the fermentate at a pH of 2.5–4.5, which precipitates a purer dextran having less phosphates and other "impurities" associated with it. The relatively pure dextran may be further purified by filtering out the precipitate, redissolving it in water, adjusting the pH of the solution to 7.0 with sodium hydroxide and reprecipitating the dextran. Several precipitations may be performed to assure the recovery of completely pure dextran. The purified material may be dried free of the precipitant and most of the water, and is then ready to be reduced to a powder and packaged. The dextrans exert their soil-stabilizing effect on the soil in the presence of water which by swelling or solving the dextran causes it to form a film over the soil particles with the films on adjacent particles tending to adhere in a bonded aggregated relation, or causes the dextran to form small discrete masses between the soil particles, such masses by adhering to adjacent particles, tending to bind the soil particles together in the form of the stable soil aggregates. Dry, particulate mixture of dextrans may be applied directly to or incorporated in the soil to various depths from the surface to a depth of three inches or even to plow depth in certain agricultural applications, as for instance, by distributing the mix evenly on the soil and then incorporating it to the desired depth by harrowing, discing, rotary tilling or thorough hand raking, while the soil contains an amount of moisture which does not preclude ready mixing. Water may be thereafter applied to the soil to solve or swell the dextran. Alternatively, the water required for swelling or solving the dextrans may be applied with the mixture, as by delivering the dextrans to the soil in an aqueous spray.

Instead of the "native" dextran obtained as described above, there may be used water-soluble or hydratable "native" dextrans or dextrans of equivalent high molecular weight obtained by other methods. For instance, the "native" high molecular weight dextrans obtained using the microorganisms bearing NRRL classifications; *Leuconostoc mesenteroides* B–1190 and B–1208 and *Leuconostoc dextranicum* B–1146 may be used.

Water-soluble or hydratable dextrans having molecular weights equivalent to or approximating that of the "native" dextrans described but obtained by other methods such as by enzymatic action in the substantial absence of bacteria, or by bacterial conversion of 1,4 linkages of dextrin to 1,6 linkages of dextran may also be used as the high molecular weight components of the dextrans mixture.

The water-soluble or hydratable low molecular weight dextran also may be obtained in any suitable way, directly by a microbiological process carried out under controlled conditions, for instance using selected enzymes, or indirectly by acid or enzymatic hydrolysis of a dextran having a higher molecular weight, such as a "native" microbiologically produced dextran as described herein, or of an initially water-insoluble or substantially water-insoluble "native" dextran to a low molecular weight water-soluble or hydratable stage.

Most advantageously, there may be used as the low molecular weight dextran soil conditioner, the low molecular weight products obtained in the conventional production of so-called "clinical" dextran and which has hitherto been discarded as waste. "Clinical" dextran for intravenous injection as a blood plasma extender is obtained conventionally by acid hydrolysis of "native" microbiologically produced dextran, usually that obtained using *Leuconostoc mesenteroides* B–512, followed by fractionation in the course of which the fractions of molecular weight unsuitable for use in the parenteral injection fluid are discarded, including the dextran having a low molecular weight in the range of 5,000 to 50,000. In accordance with this invention, these low molecular weight fractions are used as such in conditioning and stabilizing predominantly sandy soils or are used as a "diluent" for the high molecular weight or "native" dextran in the conditioning of soils of all types and which may comprise fine clay and silt particles as well as coarse sand particles.

The high molecular weight dextrans have been shown to compete favorably with the electrolytes of the "Krilium" type in general effectiveness as soil conditioning and stabilizing agents. We have demonstrated by test that mixtures of the low and high molecular weight water-soluble or hydratable dextrans as defined herein are at least equally as effective as the straight high molecular weight dextrans or electrolytes. In addition the dextrans mixtures are effective as conditioners for sand particles, and use thereof results in stabilization of the soil as a whole, including the sand component for which both the high molecular weight dextrans and the electrolytes are deficient. This effectiveness of the dextrans mixtures in stabilizing soil which may comprise a high proportion of sand is attributed to the specificity which we have found the dextrans to exhibit in relation to the size of the soil particles. Thus, we have found that when a soil comprising silt clay, and sand is treated with 0.3% by weight based on soil weight of the dextran fraction having an average molecular weight in the range 5,000 to 50,000, obtained in the production of "clinical" dextran by a method involving hydrolysis and fractionation of "native" B–512 dextran, the three components of the soil exhibit percent increase in stability as follows:

| Sand | Silt | Clay |
| --- | --- | --- |
| 75.8 | 29.0 | 21.4 |

When the same soil is treated with 0.3% of a mixture of, by weight, 50% of the "native" high molecular weight (unhydrolyzed) B–512 dextran and 50% of the dextran fraction of molecular weight 5,000 to 50,000, the components exhibit a percent increase in stability as follows:

| Sand | Silt | Clay |
| --- | --- | --- |
| 62.7 | 69.8 | 97.3 |

As will be apparent, when the low molecular weight dextran is used alone, the sand component of the soil is stabilized preferentially, and the fine clay and silt particles also show an increase in stability which is, however, considerably less pronounced. The mixture of the two type of dextrans effects marked stabilization of all three components of the soil. Thus, it is possible to dilute the high molecular weight dextran with dextran which may be that material presently discarded as waste and still achieve highly satisfactory aggregation and stabilization of silt and clay particles making up the soil, as well as of sand particles which may be present therein. This is particularly significant in view of the fact that "clinical" dextran is being produced on a large scale and increase in the volume produced is anticipated. In addition, the discovery of the specificity of the dextrans as soil conditioning materials and the relationship between the molecular weight of the dextran and the soil particle size which exists and determines the effectiveness of the dextran makes available a means for stabilizing the sand particles which may not be stabilized effectively by the high molecular weight dextrans or by polymeric polyelectrolytes. The low molecular weight dextrans may be used in the stabilization of agricultural soils in admixture with the high molecular weight dextrans or they may be used alone for conditioning predominantly sandy soil. The materials may be used to convert impassable roadbeds, swamps, muds, etc. into traversable roadbeds.

The molecular weights of the dextrans used in practicing this invention were ascertained by the accepted light scattering measurements determinations.

The polymeric polyelectrolytes which have been proposed for use in conditioning and stabilizing soil include polymeric organic substances which, when contacted with an aqueous medium, form organic ions having a substantial number of electrical charges distributed at a plurality of positions thereon. Examples of these polyelectrolytes are the equimolar copolymers of a polycarboxylic acid derivative and at least one other monomer copolymerizable therewith such as copolymers of maleic acid, fumaric acid, itaconic acid, citraconic acid, aconitic acid, the amides of the acids, the alkali metal, alkaline earth metal and ammonium salts thereof, the partial alkyl esters, salts of the partial alkyl esters and the substituted amides of the acids, with, for example, hydrophobic comonomers such as ethylene, propylene, isobutylene, styrene, α-methylstyrene, vinyl acetate, vinyl chloride, vinyl formate, vinyl alkyl ethers, alkyl acrylates and alkyl methacrylates. Other polyelectrolytic polymers have also been disclosed for soil conditioning purposes. Particular synthetic polyelectrolytes which have been found effective soil stabilization agents are hydrolyzed polymers of acrylonitrile and the calcium and sodium salts thereof. One of the most widely known polymeric polyelectrolytes of this type derived from acrylonitrile is the product marketed under the name "Krilium."

A common complaint about the polyelectrolytes such as "Krilium" has been the comparatively high cost of the material especially when the acreage of soil to be stabilized is high. We have found that "Krilium" may be diluted or extended with dextran having a molecular weight of 5,000 to 50,000 without any serious reduction in the effectiveness as conditioner and stabilizer for soil comprising clay, silt and sand particles and with improvements in the stability of the sand particles resulting from the specific conditioning and stabilizing effect of the low molecular weight dextran on the sand particles. Thus when 0.3% of the soil weight of a mixture of 50% "Krilium" and 50% dextran having a molecular weight in the range 5,000 to 50,000 is applied to soil comprising clay, silt and sand, the overall increase in stability is found to be 41%, which compares very favorably with the results obtained using 0.3% by weight of "Krilium" alone. The mixture is considerably less costly, particularly when the dextran is the normally discarded low molecular weight material of "clinical" dextran production.

The low molecular weight dextrans may be applied to the soil in amounts between 0.1% and 5.0% by weight, and are preferably used in amounts between 0.3% and 0.6% by weight, based on the soil weight. Mixtures of the low molecular weight (5,000 to 50,000) dextrans with the high molecular weight or "native" dextrans or synthetic polymeric polyelectrolytes may be used in the same amounts and in these mixtures the proportions of the low molecular weight dextran component may be varied and may be from 35% to 65%. Usually mixtures comprising 50% by weight of the low molecular weight dextran and 50% by weight of dextran having a molecular weight equivalent to that of microbiologically produced "native" dextrans or of the synthetic polymeric polyelectrolyte will be found generally satisfactory.

The low molecular weight dextran may be added to a crude fermentate containing "native" dextran in amounts to give the appropriate proportions of the two dextran types, the addition being made before sterilization of the crude product or immediately before application is made to the soil.

The liquid product comprising the fermentate is particularly advantageous for use on soils lacking in an essential metallic element because, prior to the sterilization, soluble salts of metals such as copper, zinc, manganese, or the trace elements generally, may be added to it. Only small amounts of such elements, of the order of 0.1 of 1% by weight, need be added to provide a source of supply for deficient soil. The addition may be made by simply stirring the soluble salt into the fermentate prior to the sterilization and before or after the low molecular weight dextran is added, if it is added at that stage instead of being mixed with the sterilized, neutral fermentate just prior to use thereof.

When the soil is to be used for agricultural purposes and is lacking in plant nutrients, the dextrans mixture containing the nutrients may be employed in sufficient amount to bring the soil to a normal productive condition with respect to the concentration of plant nutrients and essential plant soil components.

The low molecular weight dextrans and mixtures thereof with high molecular weight dextrans or synthetic polymeric polyelectrolytes may be used as a mulch and spread, in the dry, particulate condition, over the plant location to be protected. The mulch may comprise other organic materials and from 1 to 10% by weight of the low molecular weight dextran or mixture.

Predominantly sandy soils and soils comprising clay, silt and sand which are treated with the low molecular weight dextrans or mixtures comprising them as described herein, show very little slaking when exposed to water, which is absorbed rapidly without "puddling." The dry or substantially dry treated soils break into a granular or crumb-like structure very readily on being worked and any clods are easily crushed by slight pressure.

It is within the scope of the invention to incorporate nitrogen-fixing bacteria such as those of the genus Rhizobia with the low molecular weight dextrans or mixtures comprising them, before they are applied to soil to be conditioned for agricultural use. Such bacteria may be, conveniently, mixed with the dry, particulate low molecular weight dextrans or mixtures and are effective with certain plants of the genus Leguminosae when grown in symbiotic relationship therewith, to fix the nitrogen of the air and convert it to organic nitrogenous compounds, thus enriching the soil around the plants and providing a nitrogenous nutrient for other succeeding crops. Plant species capable of fixing nitrogen in combination with the Rhizobia include alfalfa, clover, beans, soy beans, lupines and trefoil; thus the bacteria species *Rhizobium meliloti* is useful with alfalfa or with white or sweet clover; *Rhizobium trefolii* is useful with red, white and crimson clovers; *Rhizobium leguminosarium* infects garden peas and vetch, while *Rhizobium lupini* is effective with lupines, *Rhizobium paponicum* with soy beans, and so forth. These various species may be selected for admixture with the soil conditioner having regard to the crop to be cultivated in the conditioned soil.

In preparing compositions comprising the low molecular weight dextran or mixtures containing it, and the Rhizobia or similar bacteria, the bacteria contained in a liquid is first centrifuged or filtered therefrom, to obtain the bacteria as a sludge; this sludge is then spread out at room temperature and dried, preferably under high vacuum conditions. The dry powder containing the bacteria may then be mixed directly with the dry low molecular weight dextran or mixture, preferably generally to the extent of 0.1% by weight thereof.

This invention provides new conditioning agents and compositions which, after solving or swelling with water, markedly improve the structure or consistency of soil even when it comprises a substantial proportion of coarse sand particles, and thereby improve the working properties and general productivity. Soil of poor structure becomes loose, crumbly and porous when treated according to the invention and exhibits increased moisture retention without, however, puddling of the soil or caking thereof by the moisture retained in it. The soil may be conditioned and stabilized for agricultural or horticultural use or soil which is not intended for such use but which normally becomes impassable on wetting may be treated using the low molecular weight dextrans or mixtures thereof with the higher molecular weight dextrans or synthetic polymeric polyelectrolytes and particularly with such polymeric polyelectrolytes as hydrolyzed acrylonitrile polymers and the calicum or sodium salts thereof, in which mixtures the low molecular weight dextrans are present in amounts between 35 and 65% by weight.

The high molecular weight dextrans mentioned herein are "native" microbiologically produced, substantially unhydrolyzed dextrans or dextrans having molecular weights equivalent to or approximating that of "native" microbiologically produced dextrans such as, for example, that produced by the cultivation of *Leuconostoc mesenteroides* B–512 in a sucrose-bearing nutrient medium containing a source of nitrogen and appropriate inorganic salts.

Thus, although the invention has been described in detail in connection with mixtures of dextrans having a molecular weight or average molecular weight between 5,000 and 50,000 with dextrans having high molecular weights equivalent to or approximating that of "native" microbiologically produced dextrans such as "native" B–512 dextran, we contemplate, broadly, the use of mixtures of a dextran of relatively low molecular weight with a dextran of relatively high molecular weight, for example, mixtures of dextrans having a molecular weight or average molecular weight in the range 5,000 to 50,000 with dextrans having (or the lowest molecular weight fraction of which has) a molecular weight above 50,000, such as dextrans of molecular weight or average molecular weight in the range from 100,000 up to the molecular weight of "native" (substantially unhydrolyzed) microbiologically produced dextran. The dextrans may have substantially uniform molecular weights but when two dextran components comprising fractions of different molecular weights are mixed together to obtain the compositions, the low molecular weight component of the composition should contain no fraction of a molecular weight such that the average or overall molecular weight of that component is above about 50,000, and the high molecular weight component of the soil conditioning composition should comprise no fraction of a molecular weight such that the average or overall molecular weight of that component is below about 100,000.

We have described the dextran compositions as obtained by mixing two different dextrans together. It will be understood, however, that a "native" dextran may be obtained which, in and of itself, comprises the high molecular weight dextran and the low molecular weight dextran in the desired proportions of between 35% to 65% by weight of the one to from 65% to 35% by weight of the other. Thus, the proportion of low molecular dextran in a "native" dextran may be increased by increasing the sucrose concentration of the medium. At 10% sucrose concentration, the average molecular weight is extremely high. With increase in the sucrose concentration the proportion of low molecular weight material present in the "native" dextran increases. By increasing the sucrose concentration above 10%, say to 15% or higher, it is possible to control the molecular weight of the product and to obtain a "native" dextran comprising from 35% to 65% of a dextran having an average molecular weight of 5,000 to 50,000 and, conversely, from 65% to 35% of dextran having an average molecular weight of 100,000 or higher and up to the average molecular weight of "native" dextran produced at 10% sucrose concentration in the culture medium. The "native" product obtained directly may, therefore, comprise a mixture of the dextrans of desired high and low average molecular weight in the desired proportions and such products are contemplated as soil conditioning and stabilizing compositions within the scope of this invention.

The molecular weights stated herein are determined by light scattering measurements.

It will be understood that, while specific embodiments of the invention have been discussed, the invention is not intended to be limited or circumscribed by the details given since various modifications and changes may be made which are within the purview of the disclosure and of the appended claims.

We claim:

1. In the conditioning and stabilizing of soil for plant husbandry and comprising sand, silt and clay, using NRRL dextran as the conditioning and stabilizing agent, the improvement which comprises preferentially and selectively binding the coarse sand particles of the soil into small, workable aggregates by mixing the soil with hydratable dextran having an average molecular weight between 5,000 and 50,000, determined by light scattering measurements, and then wetting the soil in contact with said dextran.

2. In the conditioning and stabilizing of soil for plant husbandry and comprising sand, silt and clay, using NRRL dextran as the soil conditioning and stabilizing agent, the improvement which comprises preferentiallly and selectively binding the fine clay and silt particles into small, workable aggregates by mixing the soil with hydratable dextran having an average molecular weight of at least 100,000, determined by light scattering measurements, and then wetting the soil.

3. In the conditioning and stabilizing of soil for plant husbandry and comprising sand, silt and clay, using dextran as the soil conditioning and stabilizing agent, the improvement which comprises preferentially and selectively binding the coarse sand particles into small, workable aggregates by mixing with the soil, in the presence of moisture, hydratable dextran having an average molecular weight between 5,000 and 50,000, determined by light scattering measurements, and preferentially and selectively binding the fine clay and silt particles into small, workable aggregates by mixing with the soil, in the presence of moisture, hydratable dextran having an average molecular weight of at least 100,000, determined by light scattering measurements.

4. The method of conditioning and stabilizing soil for plant husbandry and comprising sand, silt and clay, using NRRL dextran as the soil conditioning and stabilizing agent, which comprises mixing with the soil a mixture of 35% to 65% by weight of hydratable dextran having an average molecular weight between 5,000 and 50,000, determined by light scattering measurements, and 65% to 35% by weight of hydratable dextran having an average molecular weight of at least 100,000, determined by light scattering measurements, and then wetting the soil in contact with the mixed dextrans to preferentially and selectively bind the coarse sand particles into small, workable aggregates by hydration of the dextran of molecular weight between 5,000 and 50,000 and preferentially and selectively bind the fine clay and silt particles into small, workable aggregates by hydration of the dextran of molecular weight at least 100,000.

5. The combination of soil comprising sand, silt and clay, and, for preferentially and selectively binding the coarse sand particles of the soil into small, discrete, workable aggregates in the presence of moisture, hydratable NRRL dextran having an average molecular weight between 5,000 and 50,000, as determined by light scattering measurements.

6. The combination of soil comprising sand, silt and clay and, for preferentially and selectively binding the fine silt and clay particles into small, discrete, workable aggregates in the presence of moisture, hydratable NRRL dextran having an average molecular weight of at least 100,000, determined by light scattering measurements.

7. The combination of soil comprising sand, silt and clay with from 35% to 65% by weight of hydratable NRRL dextran having an average molecular weight between 5,000 and 50,000, determined by light scattering measurements, for preferentially and selectively binding the coarse sand particles of the soil into small, discrete, workable aggregates in the presence of moisture, and from 65% to 35% of hydratable NRRL dextran having an average molecular weight of at least 100,000, determined by light scattering measurements, for preferentially and selectively binding the fine clay and silt particles of the soil into small, discrete, workable aggregates in the presence of moisture.

References Cited in the file of this patent

UNITED STATES PATENTS

| | | |
|---|---|---|
| 2,360,327 | Bailey | Oct. 17, 1944 |
| 2,437,518 | Gronwall | Mar. 9, 1948 |
| 2,565,507 | Lockwood | Aug. 28, 1951 |
| 2,625,529 | Hedrick | Jan. 13, 1953 |
| 2,764,843 | Peake | Oct. 2, 1956 |

OTHER REFERENCES

Hassid et al.: "The Structure of Dextran ——." Jour. Biol. Chem., vol. 134, pages 163–170 (June 1940).

Martin, "Microorganisms and Soil Aggregation: II. Influence of Bacterial Polysaccharides on Soil Structure." Soil Science, vol. 61, No. 2, pages 157–166 (February 1946).

Geoghegan (1948): "Aggregate Formation in Soil: I. Influence of Some Bacterial Polysaccharides ——." Biochem. J. (Great Britain), vol. 43, pages 5–13.

Ingelman et al.: "Some Physico-Chemical Experiments on Fractions of Dextran." Arkiv for Kemi, vol. 1, No. 10, pages 61–80 (Stockholm, Sweden, 1949).

The Lancet, January 22, 1949, "Dextran as a Plasma Substitute," pages 132–143.

Owen: "Dextran ——." Sugar, vol. 46, No. 2, pages 40–41 (February, 1951).

Geoghegan (1951): "Aggregate Formation in Soil. Influence of Some Microbial ——." Published before April 17, 1951 at Groningen, Netherlands, in Fourth International Congress of Soil Science (Amsterdam, 1950), Transactions, vol. 1, pages 198–201.

Mfg. Chemist, February, 1952, pages 49–54.

Whistler: "Polysaccharide Chemistry," published 1953, pages 376, 379, 380, 455, 457.